United States Patent
Schwartz et al.

(10) Patent No.: US 8,215,381 B2
(45) Date of Patent: Jul. 10, 2012

(54) METHOD FOR CONTROLLING HEAT EXCHANGER FLUID FLOW

(75) Inventors: William Samuel Schwartz, Pleasant Ridge, MI (US); Brian D. Rutkowski, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 291 days.

(21) Appl. No.: 12/421,846

(22) Filed: Apr. 10, 2009

(65) Prior Publication Data

US 2010/0262301 A1    Oct. 14, 2010

(51) Int. Cl.
| | |
|---|---|
| G05D 23/00 | (2006.01) |
| B60H 1/00 | (2006.01) |
| B60H 1/03 | (2006.01) |
| B60H 1/22 | (2006.01) |
| F02B 29/04 | (2006.01) |
| F01P 7/02 | (2006.01) |
| F01P 7/14 | (2006.01) |
| F24J 3/00 | (2006.01) |
| G05D 7/00 | (2006.01) |
| G05D 11/00 | (2006.01) |

(52) U.S. Cl. ....... 165/298; 165/202; 60/599; 123/41.05; 123/41.1; 123/41.12; 236/34.5; 237/2 A; 237/12.3 R; 700/282; 700/300

(58) Field of Classification Search ............ 60/597–599; 123/41.01, 41.02, 41.04, 41.05, 41.09, 41.1, 123/41.11, 41.12, 41.2, 41.21, 142.5 R, 41.08; 165/41, 42, 44, 47, 51, 200–202, 287, 296–298; 237/2 A, 2 R, 12.1, 12.3 R, 12.3 B; 429/428, 429/433, 434, 437, 442; 700/275, 282, 299, 700/300; 62/132, 157, 158, 190, 196.1, 201; 236/34, 34.5, 36

See application file for complete search history.

(56) References Cited

U.S. PATENT DOCUMENTS

| | | | | |
|---|---|---|---|---|
| 4,475,523 A | * | 10/1984 | Goranflo | 123/557 |
| 4,508,264 A | * | 4/1985 | Takeda et al. | 237/12.3 B |
| 4,768,484 A | * | 9/1988 | Scarselletta | 123/41.21 |
| 4,895,301 A | | 1/1990 | Kennedy | |
| 4,930,455 A | | 6/1990 | Creed et al. | |
| 5,014,910 A | * | 5/1991 | Koch et al. | 237/2 A |
| 5,031,579 A | * | 7/1991 | Evans | 123/41.2 |
| 5,174,254 A | * | 12/1992 | Humburg | 123/142.5 R |
| 5,555,854 A | | 9/1996 | Huemer et al. | |
| 5,724,924 A | * | 3/1998 | Michels | 123/41.12 |

(Continued)

FOREIGN PATENT DOCUMENTS

JP    2001206053 A  *  7/2001

*Primary Examiner* — Crystal J Barnes-Bullock
(74) *Attorney, Agent, or Firm* — David Kelley, Esq.; Tung & Associates

(57) ABSTRACT

In an exemplary embodiment, a method to control excessive temperature changes in a coolant circuit includes providing a coolant circuit including a bypass flow pathway bypassing a heat exchanger, said coolant circuit at an elevated operating temperature; providing an adjustable coolant flow through said bypass flow pathway and said heat exchanger; providing a coolant pump in said coolant circuit; determining a temperature change in said coolant circuit in response to initiating a coolant flow from said heat exchanger into said coolant circuit, said temperature change greater than a predetermined limit; and in response to said determined temperature change, adjusting at least one or more of said coolant pump speed and said coolant flow to maintain said coolant circuit within a predetermined temperature range.

19 Claims, 1 Drawing Sheet

U.S. PATENT DOCUMENTS

| | | | |
|---|---|---|---|
| 5,730,089 A * | 3/1998 | Morikawa et al. | 123/41.14 |
| 6,405,688 B1 | 6/2002 | Dahm et al. | |
| 6,477,989 B2 * | 11/2002 | Suzuki et al. | 123/41.1 |
| 6,508,211 B1 * | 1/2003 | Asano | 123/41.1 |
| 6,530,347 B2 * | 3/2003 | Takahashi et al. | 123/41.1 |
| 6,607,142 B1 * | 8/2003 | Boggs et al. | 237/12.3 B |
| 6,647,934 B2 * | 11/2003 | Marsh et al. | 123/41.33 |
| 6,651,761 B1 * | 11/2003 | Hrovat et al. | 429/442 |
| 6,684,826 B2 * | 2/2004 | Yoshikawa et al. | 123/41.1 |
| 6,739,290 B2 * | 5/2004 | Iwasaki et al. | 123/41.05 |
| 6,745,726 B2 | 6/2004 | Joyce et al. | |
| 6,758,172 B2 | 7/2004 | Morgan et al. | |
| 6,799,631 B2 * | 10/2004 | Acre | 165/297 |
| 6,863,221 B2 * | 3/2005 | Colas et al. | 236/34.5 |
| 6,867,395 B2 * | 3/2005 | Santanam | 219/494 |
| 6,904,875 B2 * | 6/2005 | Kilger | 123/41.1 |
| 6,955,141 B2 * | 10/2005 | Santanam et al. | 123/41.08 |
| 7,080,520 B2 * | 7/2006 | Satzger | 62/196.4 |
| 7,465,508 B2 * | 12/2008 | Alp et al. | 429/414 |
| 7,669,417 B2 * | 3/2010 | Smith | 60/599 |
| 7,775,268 B2 * | 8/2010 | Sato et al. | 165/202 |
| 2004/0065275 A1 | 4/2004 | Hayami et al. | |
| 2004/0112046 A1 * | 6/2004 | Tumati et al. | 60/297 |
| 2005/0006487 A1 | 1/2005 | Suda et al. | |
| 2005/0139400 A1 * | 6/2005 | Gee | 180/65.2 |
| 2008/0142190 A1 * | 6/2008 | Chang et al. | 165/44 |
| 2010/0200195 A1 * | 8/2010 | Himmelsbach | 165/51 |
| 2010/0300100 A1 * | 12/2010 | Harmon et al. | 60/645 |

* cited by examiner

METHOD FOR CONTROLLING HEAT EXCHANGER FLUID FLOW

FIELD OF THE INVENTION

This invention generally relates to methods for controlling fluid flow within a system, and more particularly provides a method for controlling heat exchanger fluid flow, including vehicle radiator fluid flow, to avoid or control unwanted cold fluid flows within the system to prevent undesired temperature differences across system components.

BACKGROUND OF THE INVENTION

In cooled systems, including automobiles it is desirable to operate the system within a temperature range. A flow of coolant is typically used to remove heat from heat producing components in a system and transport it to a heat exchanger where it can directly or indirectly be removed from the system. For example, in an automobile the heat exchanger is in the form of a radiator, which is typically a liquid to air heat exchanger.

In many instances, it is desirable to allow the coolant temperature to first rise to a given temperature or temperature range to facilitate elevated temperature operation of the system. In this operating mode, the heat exchanger is typically not utilized with the coolant flow diverted around, or bypassing, the heat exchanger by means of a flow control device such as a conventional wax pellet driven thermostat or a flow control valve.

As the desired operating temperature range of the system is reached, heat must then be rejected (removed) from the coolant to maintain the operating temperature within the desired operating temperature range. The transition between heating and cooling of the coolant within the coolant circuit is typically accomplished by allowing some portion of the coolant to be diverted through the heat exchanger by utilizing a flow control device. The temperature of the coolant can then be maintained by blending some portion of the diverted cooled coolant with a portion which has not been cooled.

One shortcoming with the above method of maintaining an operating temperature range of a system using a bypass circuit is the occurrence of an excessive quantity of cold coolant, also referred to as a cold slug, which is released from the heat exchanger into the system when the flow control device operates to divert a portion of the coolant to the heat exchanger. The cold slug can cause excessive coolant temperature differences within the coolant circuit and therefore across the various system components within the coolant circuit, thereby leading to degraded system performance and/or reduced component life.

Thus, there is a need for improved methods to control a flow of coolant in order to avoid or control unwanted cold coolant flows within a cooled system to prevent undesired temperature differences across system components comprising the cooled system.

Therefore it is an object of the invention to provide an improved method to control a flow of coolant in order to avoid or control unwanted cold coolant flows within a cooled system to prevent undesired temperature differences across system components comprising the cooled system.

SUMMARY OF THE INVENTION

These and other objects, aspects and features of the invention will be better understood from a detailed description of the preferred embodiments of the invention which are further described below in conjunction with the accompanying Figures.

BRIEF DESCRIPTION OF THE DRAWINGS

In an exemplary embodiment, a method to control excessive temperature changes in a coolant circuit includes providing a coolant circuit including a bypass flow pathway bypassing a heat exchanger, said coolant circuit at an elevated operating temperature; providing an adjustable coolant flow through said bypass flow pathway and said heat exchanger; providing a coolant pump in said coolant circuit; determining a temperature change in said coolant circuit in response to initiating a coolant flow from said heat exchanger into said coolant circuit, said temperature change greater than a predetermined limit; and in response to said determined temperature change, adjusting at least one or more of said coolant pump speed and said coolant flow to maintain said coolant circuit within a predetermined temperature range.

DETAILED DESCRIPTION OF THE PREFERRED EMBODIMENT

The present invention achieves the foregoing objects, aspects and features by providing a method to control a flow of coolant in order to avoid or control unwanted cold coolant flows (cold slug) within a cooled system to prevent undesired temperature differences across system components comprising the cooled system.

It will be appreciated that although the invention is implemented in exemplary manner with respect to a vehicle coolant system, where the vehicle may include a fuel driven motor, including a fuel cell, an electric driven motor, or a hybrid of the foregoing, such as a Hybrid Electric Vehicle (HEV), it will be appreciated that the method of the present invention may be applied to other systems which are cooled or heated by a heat exchanger and which operate at a different temperature range compared to ambient temperature. It will further be appreciated that other types of heat exchangers (other than air cooled) may be used such as a liquid to liquid heat exchanger.

In one embodiment, a cooled system (e.g., vehicle) is operated within an operating temperature range and the coolant flowing though a coolant circuit comprising the system is heated to within an operating temperature range by operating system components being part of the coolant circuit, for example, a heat producing unit such as a motor or fuel cell. The coolant circuit bypasses a heat exchange unit until the coolant is within a temperature range or is above a temperature threshold, at which point coolant control may be initiated according to exemplary embodiments. Coolant control may be accomplished according to exemplary embodiments by controlling one or more of a flow control valve for diverting a coolant to a heat exchanger, a coolant pump speed, and a heat exchanger cooling fan speed to keep the coolant temperature within a desired operating temperature range while avoiding undesired temperature variations of coolant within the coolant circuit.

Figure 1:
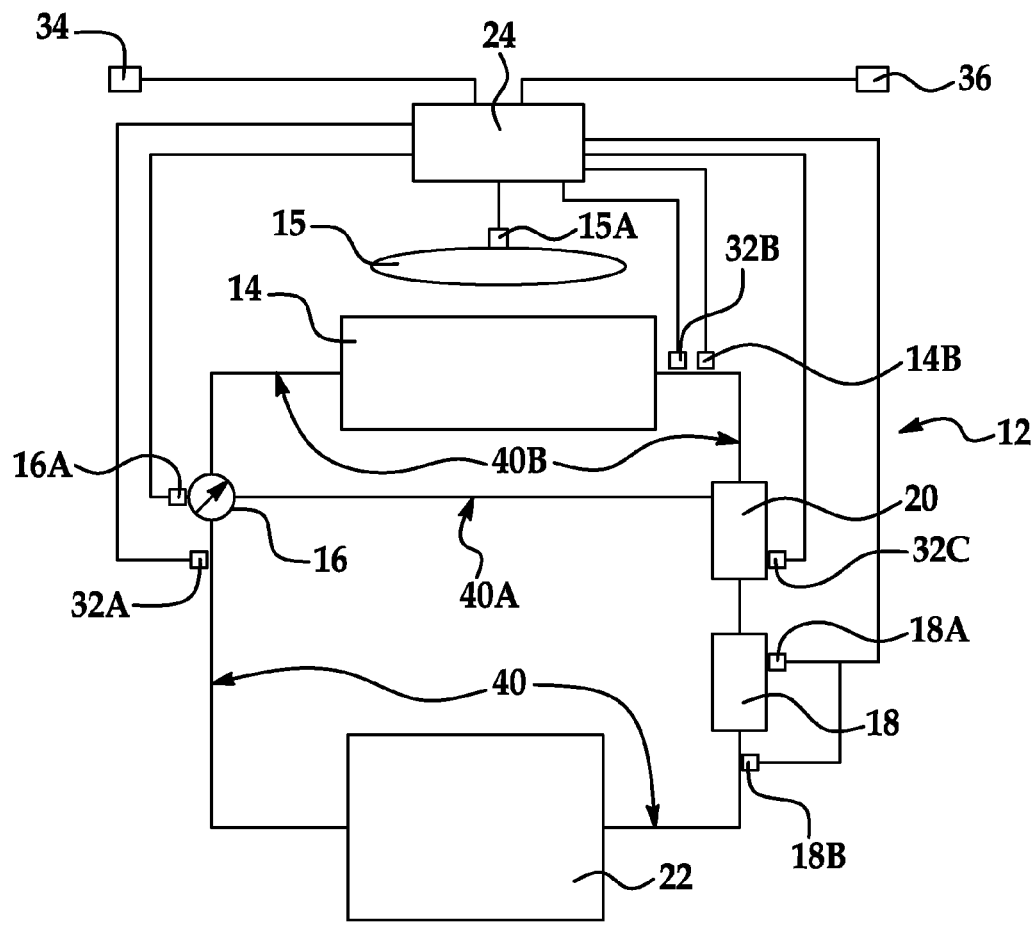
FIG. 1 is a schematic diagram of a coolant circuit according to several embodiments of the present invention.

It will be appreciated that undesired temperature variations are caused by a quantity of cooled coolant, also referred to as a cold slug, entering the coolant circuit from the heat exchanger upon a portion of the coolant being diverted through the heat exchanger. The magnitude of cold slug may be characterized by the temperature of cold coolant (or temperature difference compared to the coolant circuit) delivered into the coolant circuit from the heat exchanger as well as the quantity of cold coolant delivered from the heat exchanger where the temperature of the cold slug may be determined or predicted at a point in time when cold coolant begins to flow from the heat exchanger into the coolant circuit. For example, the magnitude of the cold slug may be affected by several factors including, but not limited to:

a) coolant flow within system (e.g., flow resistance)
b) coolant pump performance
c) heat exchanger performance
d) coolant flow control valve performance
e) ambient air temperature
f) vehicle road speed
g) time coolant has been cooled in heat exchanger For example, referring to FIG. 1 is shown a block schematic of an exemplary vehicle cooling system 12 including several embodiments of the invention, including a radiator 14, a radiator fan 15, a split flow control valve (thermostat) 16, a coolant circuit pump 18, a coolant mixing unit 20, and a heat producing unit 22 (e.g., motor or fuel cell) within the coolant circuit.

Also shown is a controller 24 including inputs from several sensors and devices, such as coolant temperature sensors 32A, 32B, and 32C, ambient temperature sensor 34, vehicle road speed sensor 36, radiator fan speed input/output 15A, coolant pump speed input/output 18A, and flow control valve 16 input/output 16A. It will be appreciated that in some embodiments, certain sensors may not be included.

For example, the controller 24 may be in two way communication with the radiator fan input/output 15A in order to receive input to sense a speed of the radiator fan as well as to output a control speed to control the radiator fan. It will be appreciated that in some embodiments, the radiator fan may be only be commanded to operate at a selected control speed or the radiator fan may not be included.

Likewise, the controller 24 may be in two way communication with one or more coolant pumps 18, e.g., input/output 18A in order to receive the coolant pump speed as well as to output a desired coolant pump speed. It will be appreciated that in some embodiments, the pump speed may only be sensed and where the pump speed is separately controlled, such as by vehicle operation.

Further, the controller 24 may be in two way communication with the split (two-way) flow control valve input/output 16A in order to control a degree of split flow between bypass flow circuit pathway 40A and radiator flow circuit pathway 40B. It will be appreciated that in some embodiments the flow control valve 16 may be passively controlled, such as by a conventional passively controlled thermostat, such as a wax pellet driven thermostat. In addition, in some embodiments, the split flow control valve 16 may be positioned upstream and/or downstream of the heat exchanger 14 at an intersection of flow circuit pathway 40A and radiator flow circuit pathway 40B.

It will further be appreciated that there may be one or more controllers in addition to, or in place of, a central controller 24, for example including individual proportional integral (PI) controllers, such as a separate PI to control pump speed in response to temperature differential in coolant temperature input and output to the heat producing unit 22.

In exemplary operation, the coolant split flow control valve 16 is used to control the coolant flow in a predetermined flow split between the bypass flow circuit pathway 40A and radiator flow circuit pathway 40B connected to coolant flow circuit 40. The degree of split flow may be adjustable from 0% to 100%, or some smaller included range, for each of the bypass flow circuit pathway and 40A the radiator flow circuit pathway 40B. The predetermined flow split may be predetermined by determining the magnitude of the cold slug by taking into account one or more of the factors listed above to maintain the temperature (or rate of temperature change) in the coolant circuit within a predetermined range.

For example, the predetermined flow split between the bypass flow circuit pathway 40A and radiator flow circuit pathway 40B can be a function of the valve position, coolant pump speed, coolant temperature, and the difference in resistance to coolant flow through the radiator and the bypass. In an exemplary embodiment, a characterization map or a functional relationship between the foregoing parameters may be separately developed and stored in controller 24 memory in order to predetermine the flow split valve position as a function of one or more of coolant pump speed, coolant temperature, and the difference in resistance to coolant flow through the radiator and the bypass according to a computer program being executed by the controller.

In another exemplary embodiment, the temperature of the coolant in the radiator (e.g., at the output) can be calculated (predicted) by a controller, such as controller 24, based on previous determination of parameters affecting heat transfer performance of the radiator, such as ambient temperature, vehicle speed, radiator cooling fan speed, coolant time in the radiator (e.g., without flow), in addition to radiator design, radiator vehicular installation, etc.

Thus, the temperature and quantity of coolant input (coolant slug magnitude) into the cooling circuit from the radiator may be predicted (calculated) by a hypothetical position of valve together with previously determined radiator cooling and flow characteristics in combination with one or more near real-time (current) measurements affecting radiator cooling such as ambient temperature, vehicle speed, radiator cooling fan speed, and coolant time in the radiator.

In another exemplary embodiment, the temperature of the coolant in the coolant circuit without cooling input from the radiator can be measured directly in near real-time, such as by temperature sensors in the coolant circuit before entering the radiator e.g., 32A. In addition, the temperature within the radiator and/or at the radiator output e.g., 32B may be measured. The measured temperatures may then be input to a computer program to determine the magnitude of the cold slug based on pump speed and split flow valve position (e.g., based on a determined cold slug quantity) and thereby predict a temperature variation within the coolant circuit caused by the cold slug. In response, a controller such as controller 24, operating according to a preprogrammed computer program, may adjust one or more of the pump speed and split flow valve position 16 to maintain the temperature (or rate of temperature change) in the coolant circuit within a predetermined range.

Thus, according to exemplary embodiments, the magnitude of the cold slug may be predicted (or measured) before a valve control action is initiated, and the split flow valve adjusted in response to maintain the coolant circuit temperature within a predetermined temperature range. For example, the controller may calculate an acceptable maximum or acceptable range in magnitude (temperature and quantity) of the cold slug that would allow the temperature change in the coolant circuit to stay within a predetermined range, or where the temperature difference between an input and an output of a component within the coolant circuit (e.g., heat producing unit 22) is maintained within a predetermined temperature range.

In another exemplary embodiment, the temperature of the coolant in the coolant circuit (without input from the radiator) and coolant temperature within and/or output from the radiator (including rate of temperature change of output) can be measured directly in near real-time, and the determined temperatures input to a computer program executed by the controller to predict a magnitude of the cold slug and in response, the controller may adjust in near real time (e.g., including time to execute program and output commands) one or more of the coolant pump speed, the flow valve position to control the split flow through the radiator, and the radiator fan speed, in order to control the temperature and quantity of cold coolant (magnitude of cold slug) input from the radiator to the coolant circuit and thereby the resulting temperature change within the coolant circuit to keep the coolant circuit temperature within a predetermined range.

In another exemplary embodiment, the pump speed may be controlled in combination with the split flow valve position. For example, the coolant pump speed can have a large influence on the flow split between the bypass portion of the coolant circuit and the radiator flow pathway. In certain situations, such as colder environments where coolant pump speed may be low (e.g., pump speed initially controlled based on cooling required by a motor or fuel cell), the flow response of the coolant through the radiator based on split flow valve position may be relatively unresponsive due to a larger resistance to coolant flow through the radiator compared to the bypass pathway. Subsequently, when the coolant pump speed ramps up based on heat producing unit coolant requirements, if the valve is still in its previously open and unresponsive position, a large cold slug may flow from the radiator causing an undesirable temperature change in the cooling circuit.

To overcome the above problem, in an exemplary embodiment, a control strategy may be implemented whereby the flow valve is pre-positioned including being closed to the radiator flow pathway to avoid the sudden cold coolant flow increase in response to pump speed. The split flow control valve may then be re-opened to pre-determined positions in response to higher pump speeds in order to control the magnitude of the cold slug and maintain the coolant circuit temperature within a predetermined range.

For example, the output temperature of coolant from the radiator may be predicted based on parameters including ambient temperature as outlined above, or actually measured in near real time, e.g., temperature sensors 32A, 32B, and the split flow control valve adjusted in near real time (e.g., including time it takes to execute a computer program and output commands) in response to a sensed (and/or output) coolant pump speed. The position of the split flow control valve may be selected based on previously determined flow resistances in the coolant circuit including through the radiator flow path at the relevant ambient temperature, thereby allowing a prediction of a flow quantity of the cold slug at a selected flow valve position, where the flow valve position is selected in order to maintain the coolant circuit temperature within a predetermined range.

Figure 2:
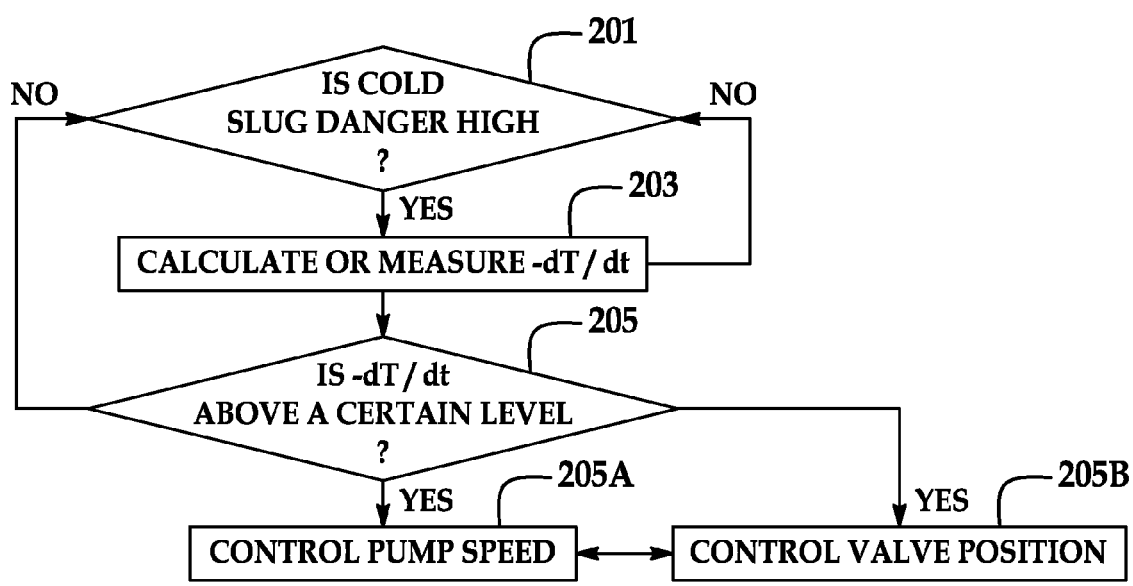
FIG. 2 is a flow diagram of an exemplary embodiment according to the present invention.

Referring to FIG. 2, is shown an exemplary control strategy to prevent excessive cold slug. In a first step, it is determined whether there exists a high probability of introducing excessive cold slug from the radiator into the coolant circuit (danger is high) upon a change in pump speed and/or flow valve position. For example, in step 201, one or more factors such as the time coolant has been cooling in the radiator, cooling rate of coolant within the radiator, the ambient temperature, and the operating or projected pump speed is considered. In step 203, If the danger is high, then the rate of temperature change e.g., (dT/dt or −dT/dt) may be calculated or monitored continuously, e.g., monitored by using sensors at one or more positions in the cooling circuit including within the radiator, near an output of the radiator, and at an area where radiator output mixes with the bypass in the cooling circuit. In step 205, it is determined whether −dT/dt is above a predetermined level (dT/dt below a predetermined level). In steps 205A, 205B, if −dT/dt is above the predetermined level, then at least one or more of the pump speed and a flow of one or more flow valves (e.g., split flow valve 16) is controlled to maintain the coolant temperature within a predetermined temperature range.

For example, the pump speed may have an upper limit imposed and/or the pump speed may be reduced to a lower speed level including ramped down at a controlled rate and then ramped up in speed at a controlled rate. It will be appreciated that the ramp down or ramp up in speed may be accomplished by a constant ramped rate, ramped in a series of stepped speed increases, or a combination of the foregoing over a predetermined period of time. Additionally or alternatively, in step 205B the flow position of one or more flow valves e.g., split flow control valve 16 may be controlled. For example, in the event −dT/dt is determined to be above a predetermined level during ramp up of the pump speed, the valve position may be partially or fully closed and then progressively re-opened at higher pump speeds as the cold slug is removed from the radiator.

In another exemplary embodiment, both the coolant temperature within and/or near an output from the radiator and the coolant flow rate may be measured directly e.g., temperature sensors 32A, 32B, flow rate sensors 14B, 18B, in order to select in near real time the appropriate flow positions for flow valves such as the split flow valve 16, where the selected flow position is based on a sensed or controlled coolant pump speed thereby allowing a more accurate near real-time determination of both quantity and temperature (magnitude) of the cold slug in order to select at least one or more of a pump speed and flow valve positions to maintain the coolant circuit temperature within a predetermined range.

In a related embodiment, flow valves such as the split flow valve 16, may be opened to a selected position for a short period of time to allow initial temperature and/or flow rate measurements to predict the magnitude of the cold slug at the selected split flow valve position, and subsequent adjustments made to one or more of the flow valve position (e.g., split flow valve 16) and the pump speed in order to maintain the coolant circuit temperature within a predetermined range.

In another exemplary embodiment, both the coolant temperature (and/or rate of temperature change) output from the radiator and the coolant flow rate may be measured directly in order to select in near real time a combination of one or more flow valve positions, e.g., split flow valve 16, and a coolant pump speed based on a coolant temperature differential between an input and output to the heat producing unit 22, and/or a rate of change of temperature at an input of the heat producing unit, in order to keep the coolant input temperature at the heat producing unit within a predetermined range. For example, both the pump speed and the split flow valve position 16 may be selected in near real time to keep the temperature differential within a predetermined range.

In another exemplary embodiment, a resistance to flow in the radiator flow path and the bypass flow path may be designed so that the flow resistances in either path are about the same, thereby making the response of split flow (quantity of coolant flow from radiator) as a result of valve position predictable at all valve positions. Consequently, sudden changes in a flow split between alternative paths (radiator and bypass) as a result of a sudden change in pump speed is reduced or eliminated.

In another exemplary embodiment, a temperature sensor e.g., 32C may be included at an area where coolant from the radiator mixes with the bypass in the coolant circuit, such as in mixing unit 20. A temperature change caused by introduction of coolant from the radiator as a consequence of split flow valve position 16 may be determined in near real-time. Following determination of the temperature change, the one or more of the split flow control valve e.g., 16, and/or the pump speed may be adjusted in near real-time response (by the controller) to maintain the temperature change within a predetermined range. For example, the one or more split flow control valves e.g., 16 may be upstream and/or downstream of a temperature sensor e.g., 32C on the input side of a heat producing unit, and control of the one or more of the split flow control valves based on a sensed temperature e.g., by temperature sensor 32C allows near-real time control to limit a cold slug magnitude.

While the embodiments illustrated in the Figures and described above are presently preferred, it should be understood that these embodiments are offered by way of example only. The invention is not limited to a particular embodiment, but extends to various modifications, combinations, and permutations as will occur to the ordinarily skilled artisan that nevertheless fall within the scope of the appended claims.

What is claimed is:

1. In a hybrid vehicle coolant circuit having a bypass flow pathway bypassing a heat exchanger, and a coolant pump providing an adjustable coolant flow divided between the bypass flow pathway and the heat exchanger, a method to control temperature changes in the coolant circuit comprising the steps of:
   providing an adjustable coolant split flow through said bypass flow pathway and said heat exchanger, said adjustable split flow adjusted to a predetermined coolant flow of said coolant divided between said bypass flow pathway and said radiator heat exchanger;
   calculating a predicted temperature change in the coolant circuit immediately downstream of said heat exchanger in response to initiating a coolant flow from the heat exchanger into the coolant circuit; and
   in response to the temperature change, adjusting at least one or more of a speed and a flow of the coolant pump to maintain the coolant circuit within a predetermined temperature range.

2. A method to control temperature changes in a vehicle coolant circuit having coolant, a heat exchanger bypass and a coolant pump with an adjustable speed and flow rate, and a heat exchanger, the method comprising the steps of:
   calculating a predicted coolant temperature change in the coolant circuit immediately downstream of said heat exchanger in response to initiating coolant flow from the heat exchanger into the coolant circuit; and
   adjusting at least one of the coolant pump speed and the coolant flow rate to maintain the coolant temperature within a predetermined temperature range if the coolant temperature change is greater than a predetermined temperature change limit;
   wherein said coolant flow is provided by a split flow valve, said split flow valve actively controlled by a preprogrammed controller in response to said temperature change, said split flow valve adjusted to a selected position to provide a predetermined coolant flow divided between said heat exchanger and said bypass.

3. The method of claim 2, wherein said coolant flow is provided by a split flow valve, said split flow valve passively controlled in response to coolant temperature.

4. The method of claim 2, wherein said coolant flow is provided by a split flow valve upstream and/or downstream of said heat exchanger, said split flow valve adjustable to adjust a flow of said coolant between said bypass flow pathway and said heat exchanger.

5. The method of claim 2, wherein said coolant pump speed is actively controlled by a preprogrammed controller in response to said temperature change.

6. The method of claim 2, wherein determining said temperature change comprises measuring a temperature of coolant within or exiting said heat exchanger.

7. The method of claim 2, wherein determining said temperature change comprises measuring a flow rate of coolant within or exiting said heat exchanger.

8. The method of claim 2, wherein controlling said pump speed comprises ramping coolant pump speed from a first speed to a second speed according to one of a continuously ramped rate or a series of stepped pump speed changes.

9. The method of claim 2, wherein controlling said coolant flow comprises adjusting a split flow valve position to limit flow though said heat exchanger wherein said coolant pump speed is one of constant over time or changing over time.

10. The method of claim 2, wherein said determining said temperature change comprises determining coolant flow resistance through portions of said coolant circuit including said heat exchanger and said bypass circuit.

11. The method of claim 2, wherein said determining said temperature change comprises determining said heat exchanger cooling rate and time said coolant is cooled in said heat exchanger.

12. The method of claim 2, wherein said determining said temperature change comprises determining ambient temperature.

13. The method of claim 2, wherein said determining said temperature change comprises monitoring a change in said coolant temperature with respect to time at a point downstream of said heat exchanger.

14. The method of claim 2, wherein said heat exchanger comprises a vehicle radiator.

15. A method to control excessive temperature changes in a vehicle coolant circuit comprising:
   providing a coolant circuit comprising a bypass flow pathway bypassing a heat exchanger, said coolant circuit at an elevated operating temperature;
   providing an adjustable coolant split flow through said bypass flow pathway and said heat exchanger, said adjustable split flow adjusted to a predetermined coolant flow of said coolant divided between said bypass flow pathway and said heat exchanger;
   providing a coolant pump in said coolant circuit;
   calculating a predicted temperature change in said coolant circuit immediately downstream of said heat exchanger in response to initiating a coolant flow from said heat exchanger into said coolant circuit, said temperature change greater than predetermined limit; and
   in response to said determined temperature change, adjusting at least one or more of said coolant pump speed and said split flow to maintain said coolant circuit within a predetermined temperature range.

16. The method of claim 15, determining said temperature change comprises measuring a temperature of coolant within or exiting said heat exchanger.

17. The method of claim 15, wherein determining said temperature change comprises measuring a flow rate of coolant within or exiting said heat exchanger.

18. The method of claim 15, wherein controlling said pump speed comprises ramping coolant pump speed from a first speed to a second speed according to one of a continuously ramped rate or a series of stepped pump speed changes.

19. The method of claim 15, wherein controlling said split flow comprises adjusting a split flow valve position to limit flow though said heat exchanger wherein said coolant pump speed is one of constant over time or changing over time.

* * * * *